(12) United States Patent
Dupuie et al.

(10) Patent No.: US 8,739,771 B2
(45) Date of Patent: Jun. 3, 2014

(54) PORTABLE COOKING APPARATUS

(76) Inventors: Stephen C. Dupuie, Attica, MI (US); Ricky H. Meachum, Lapeer, MI (US)

(*) Notice: Subject to any disclaimer, the term of this patent is extended or adjusted under 35 U.S.C. 154(b) by 930 days.

(21) Appl. No.: 12/884,123

(22) Filed: Sep. 16, 2010

(65) Prior Publication Data
US 2011/0100351 A1    May 5, 2011

Related U.S. Application Data

(60) Provisional application No. 61/245,604, filed on Sep. 24, 2009.

(51) Int. Cl.
*A47J 37/07* (2006.01)

(52) U.S. Cl.
USPC ................. 126/25 R; 126/25 B; 126/41 R

(58) Field of Classification Search
USPC ................. 126/25 R, 25 B, 41 R
See application file for complete search history.

(56) References Cited

U.S. PATENT DOCUMENTS

| | | | | |
|---|---|---|---|---|
| 3,327,698 A * | 6/1967 | Leslie | .................. | 126/25 R |
| 3,494,349 A * | 2/1970 | Allen | .................. | 126/25 B |
| 3,765,397 A * | 10/1973 | Henderson | .................. | 126/25 R |
| 3,915,144 A * | 10/1975 | Tomita | .................. | 126/9 R |
| 5,094,223 A * | 3/1992 | Gonzalez | .................. | 126/25 R |
| 2007/0272225 A1 * | 11/2007 | McNeely et al. | .................. | 126/30 |

* cited by examiner

*Primary Examiner* — Avinash Savani
(74) *Attorney, Agent, or Firm* — Jelic Patent Services, LLC; Stanley E. Jelic

(57) ABSTRACT

A portable cooking apparatus which is designed for sport fishermen. The apparatus enables sport fishermen to cook food anywhere along a shoreline instead of in a predesignated area. The portable cooking apparatus comprises: a fire ring; a wind screen which is operationally attached to the top of the fire ring; a charcoal pan which is operationally attached to the bottom of the fire ring; a grill which is operationally attached to the fire ring above the charcoal pan; means to use gas; and a plurality of support legs operationally attached to the bottom of the fire ring. A separate embodiment further comprises a case for carrying the portable cooking apparatus.

9 Claims, 22 Drawing Sheets

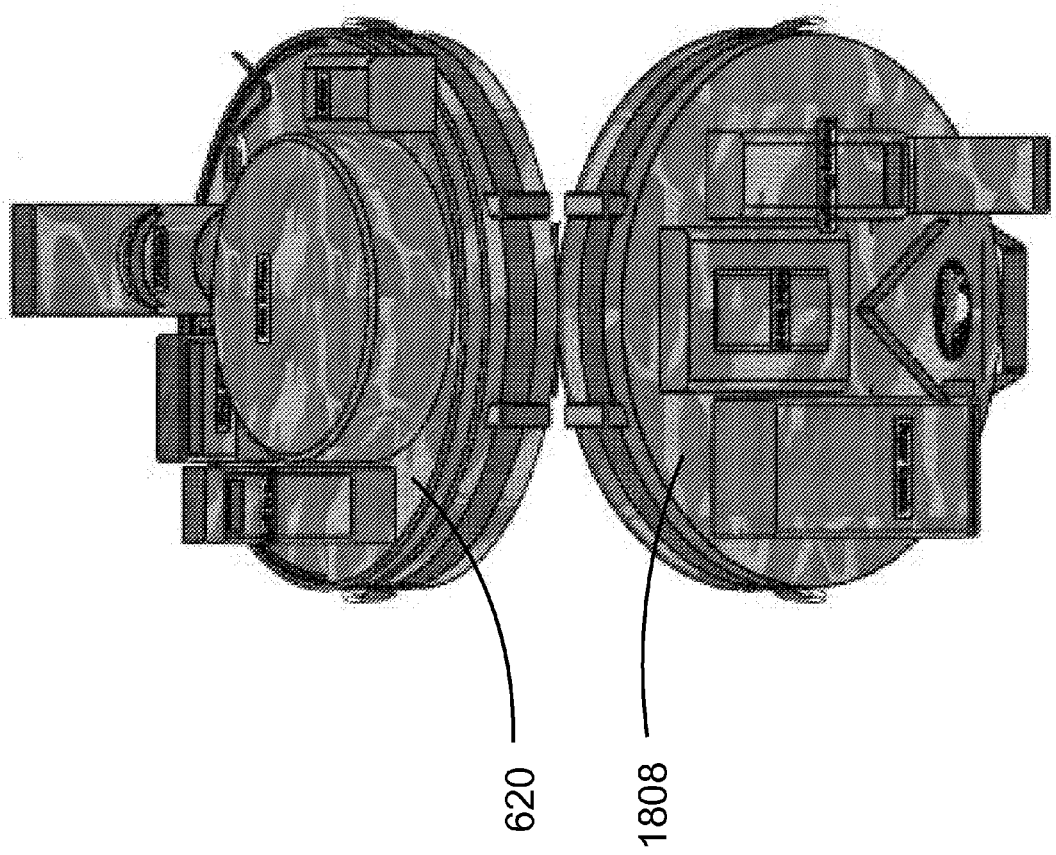

PORTABLE COOKING APPARATUS

CROSS-REFERENCE TO RELATED APPLICATIONS

This application claims the benefit of U.S. Provisional Application 61/245,604 filed Sep. 24, 2009, which is herein incorporated by reference in its entirety.

FIELD OF THE INVENTION

The present disclosure is in the technical field of portable cooking apparatuses.

BACKGROUND OF THE INVENTION

Sport fishermen typically begin fishing early in the day. For lunch, they usually must go to a predesignated area where cooking facilities are available to cook freshly caught fish.

BRIEF SUMMARY OF THE INVENTION

The present disclosure describes a portable cooking apparatus which is designed for sport fishermen. The apparatus enables sport fishermen to cook food anywhere along a shoreline instead of in a predesignated area. The portable cooking apparatus comprises: a fire ring; a wind screen which is operationally attached to the top of the fire ring; a charcoal pan which is operationally attached to the bottom of the fire ring; a grill which is operationally attached to the fire ring above the charcoal pan; means to use gas; and a plurality of support legs operationally attached to the bottom of the fire ring. A separate embodiment further comprises a case for carrying the portable cooking apparatus.

The wind screen is attached to the fire ring and can be extended to minimize the effects of wind or retracted for storage.

The fire ring circles the volume directly above the charcoal pan. It is designed to contain a fire and enable the use of charcoal or wood. The fire ring has a side-entry port which allows wood or charcoal to be introduced into the apparatus. The fire ring may be stored between the two halves of the apparatus case.

The charcoal pan is designed to hold charcoal.

The grill sits directly on the fire ring above the charcoal pan and provides a cooking surface.

The means to use gas comprises burners and controls.

The plurality of support legs comprises three legs to raise the apparatus.

The optional cooking apparatus case comprises: means to carry the apparatus, means to carry cooking equipment; and means to carry cooking supplies.

The means to carry the apparatus comprises a container with compartments for different elements of the apparatus.

The means to carry cooking equipment comprises pouches for different equipment.

The means to carry cooking supplies comprises pouches for different supplies.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

The following detailed description of the invention is merely exemplary in nature and is not intended to limit the invention or the application and uses of the invention. Furthermore, there is no intention to be bound by any theory presented in the preceding background of the invention or the following detailed description of the invention.

BRIEF DESCRIPTION OF THE DRAWINGS

FIG. 22 is a bottom view of the apparatus case while the case is open 90 degrees.

DETAILED DESCRIPTION OF THE INVENTION

Many times it isn't desirable to go to a predesignated cooking area to cook freshly caught fish. In these cases, sport fishermen don't have a good alternative.

The present disclosure describes a portable cooking apparatus with case which is designed for sport fishermen. The apparatus enables sport fishermen to cook food anywhere along a shoreline instead of in a predesignated area.

Unexpected results shown in preliminary market testing are that the apparatus may also be useful for picnics, camping, cookouts, and sporting event tailgates.

One embodiment of the portable cooking apparatus with case is called a Shore Lunch Sac. Drawings FIG. 1 through FIG. 22 are depictions of the Shore Lunch Sac. The drawings are described below.

Figure 1:
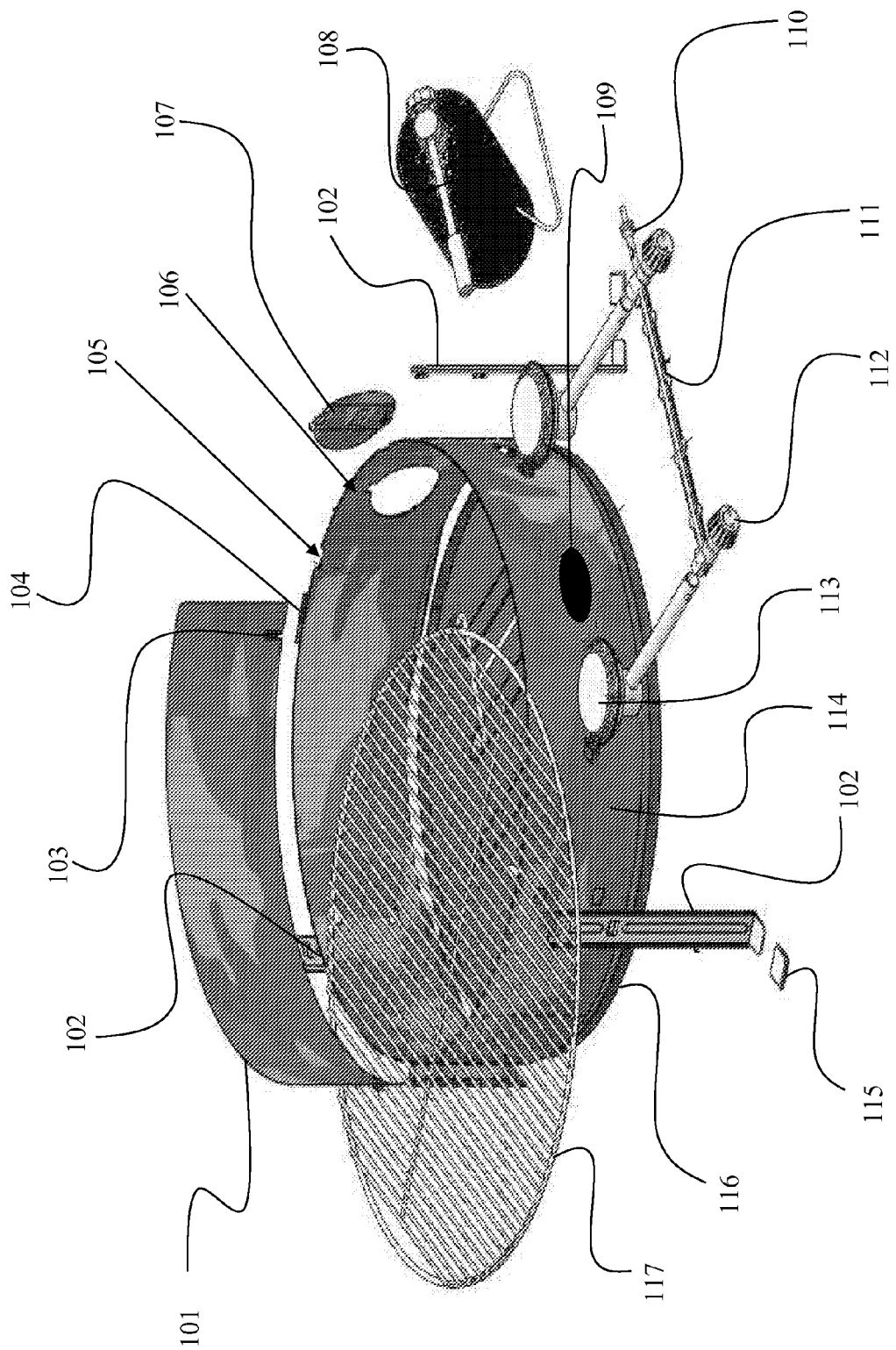
FIG. 1 shows an exploded view of a portable cooking apparatus.

FIG. 1 shows an exploded view of a portable cooking apparatus. A retractable wind screen 101 is connected to the outside of a fire ring 114 by means of wind screen securing guides 104 and wind screen up/down locking tabs 103. Located on the sides of fire ring 114 at three equidistant points are three fire ring support legs 102. At the bottom of the fire ring support legs are support leg pads 115. The bottom of the fire ring 114 is shown with the removable charcoal pan 116 and a charcoal pan support notch 105. The fire ring 114 includes a wood feeder hole 106 and a wood feeder hole cover 107. Note that charcoal may also be used via the wood feeder hole. Located above the charcoal pan 116 is a grill 117. On the side of fire ring 114 is a logo plate 109. A gas regulator 108 is attached to a gas source. Inserted into the sides of fire ring 114 are gas burners 113. The gas is regulated with gas control knobs 112 and equalized with a gas distribution tube 111. Gas enters the apparatus via a gas input connector 110.

Figure 2:
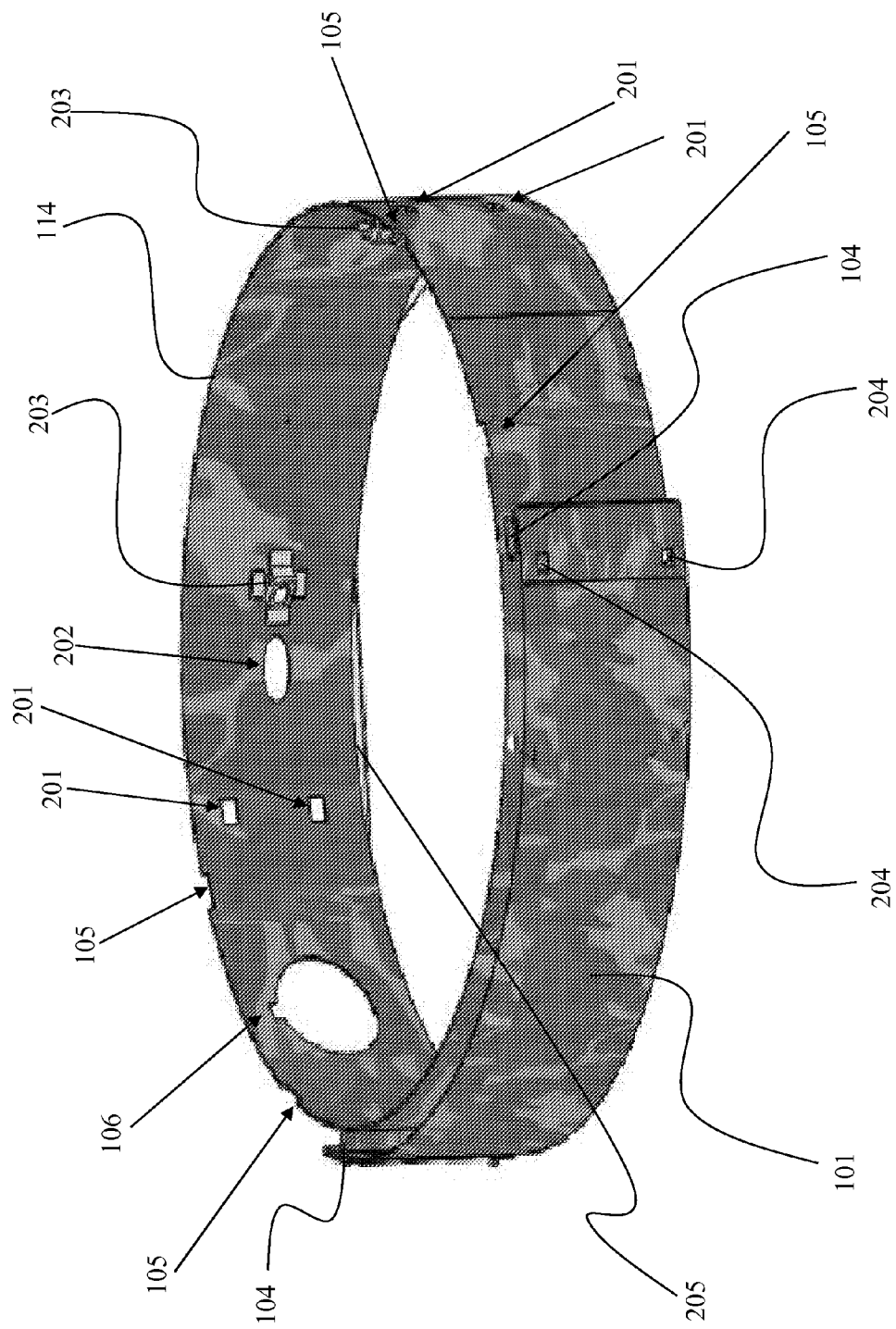
FIG. 2 shows a fire ring assembly.

FIG. 2 shows a fire ring assembly. The fire ring assembly is stored between the two Shore Lunch Sac halves. The following elements are shown as part of the fire ring assembly: retractable wind screen 101, wind screen securing guides 104, charcoal pan support notches 105, wood feeder hole 106, fire ring 114, fire ring support leg securing notches 201, a gas distribution assembly egress hole 202, two gas burner support brackets 203, wind screen locking tab cutouts 204, and a charcoal pan bottom support cleat 205.

Figure 3:
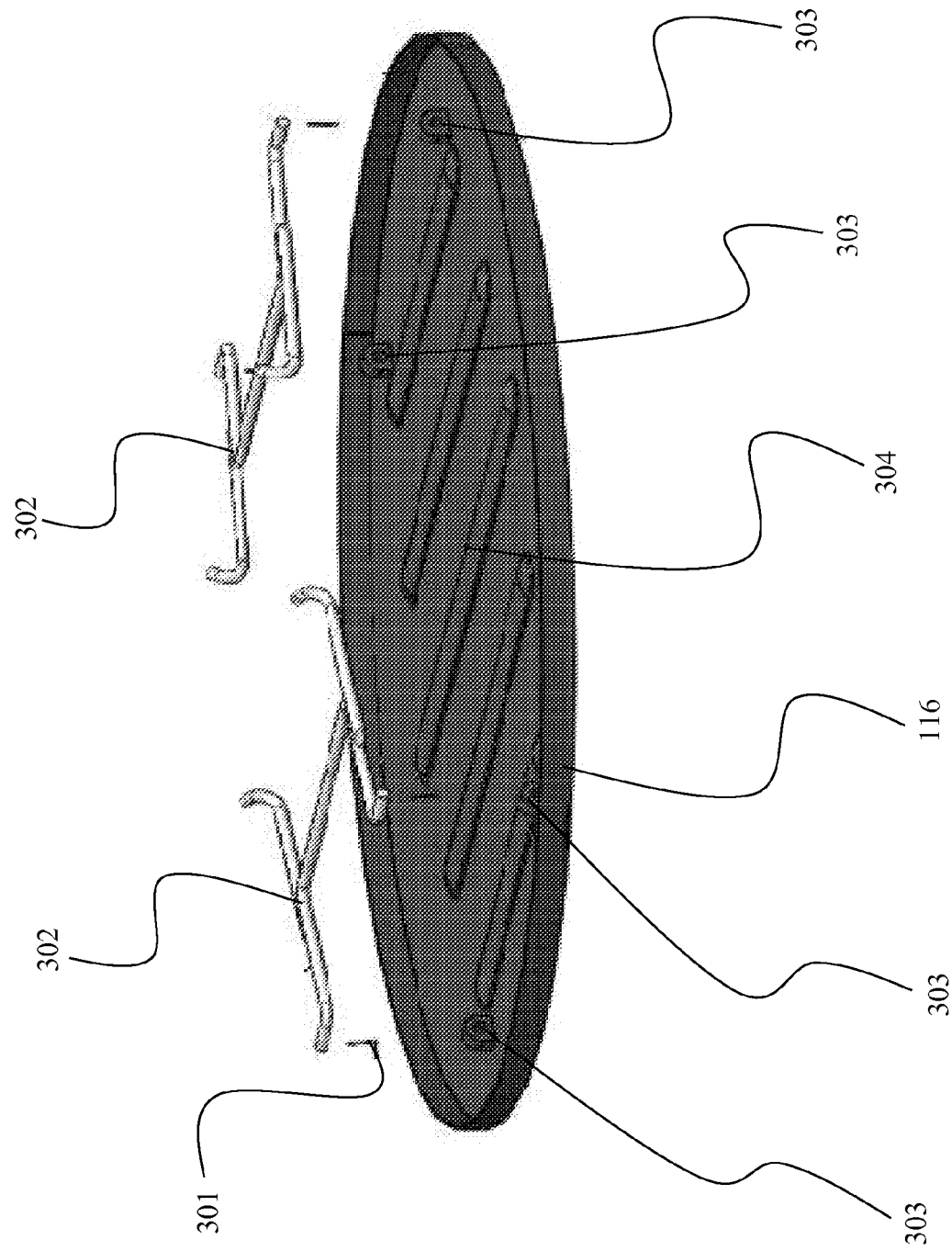
FIG. 3 shows an exploded view of a charcoal pan assembly.

FIG. 3 shows an exploded view of a charcoal pan assembly. Charcoal pan handles 302 are inserted into charcoal pan handle connections 303 and held in place with charcoal pan handle locking cotter pins 301. Charcoal pan 116 is reinforced with charcoal pan strength ribs 304.

Figure 4:
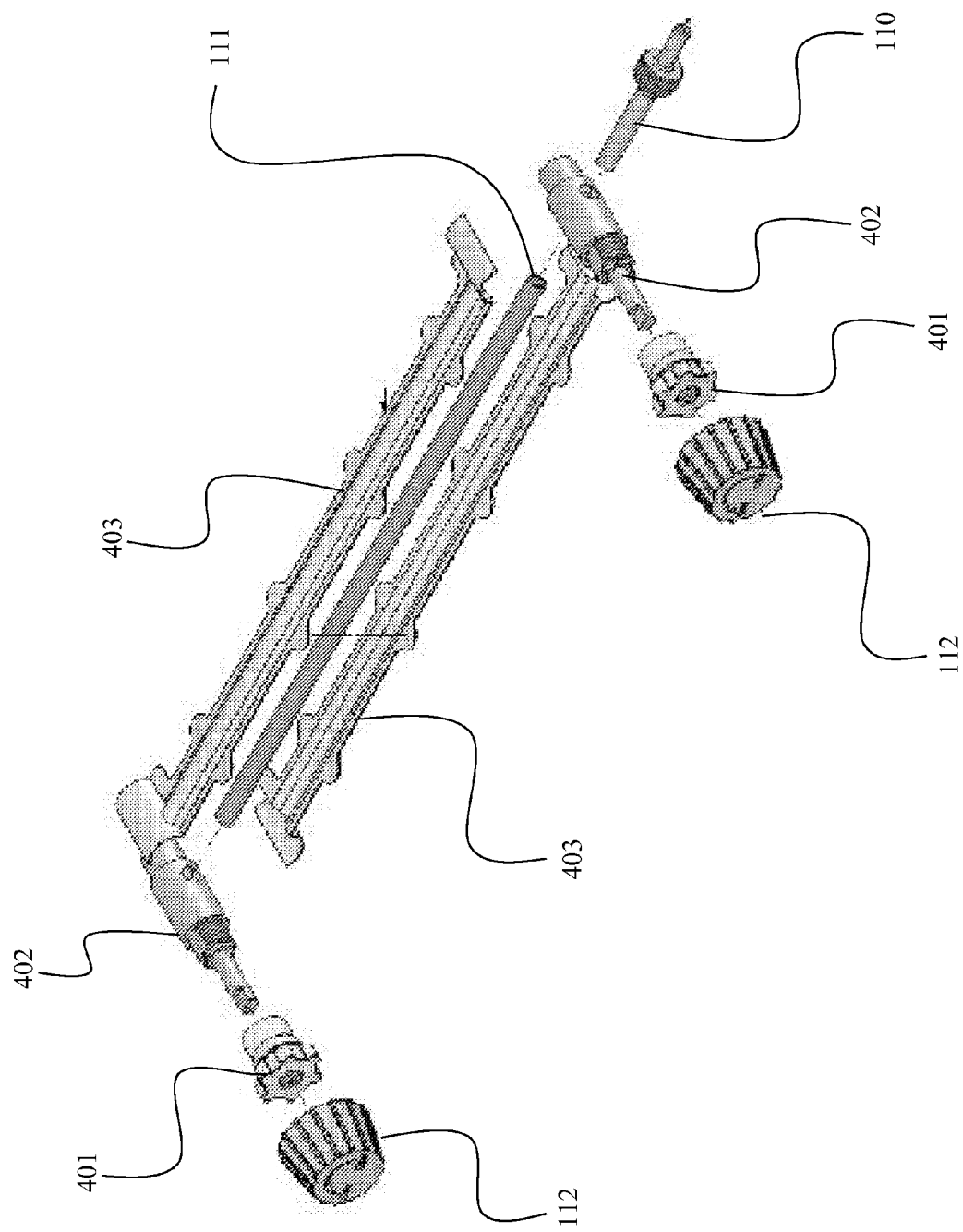
FIG. 4 shows an exploded view of a gas burner assembly.

FIG. 4 shows an exploded view of a gas burner assembly. Gas enters through gas input connector 110. The gas is then equalized between the two burners with gas distribution tube 111. The gas flows into the space within the fire ring through the gas distribution valves 402. Gas burner support bracket retaining nuts 401 connect the gas distribution valves 402 to the fire ring 114. The gas control knobs 112 control the rate of gas flow. The gas burner assembly is reinforced with strength arms 403.

Figure 5:
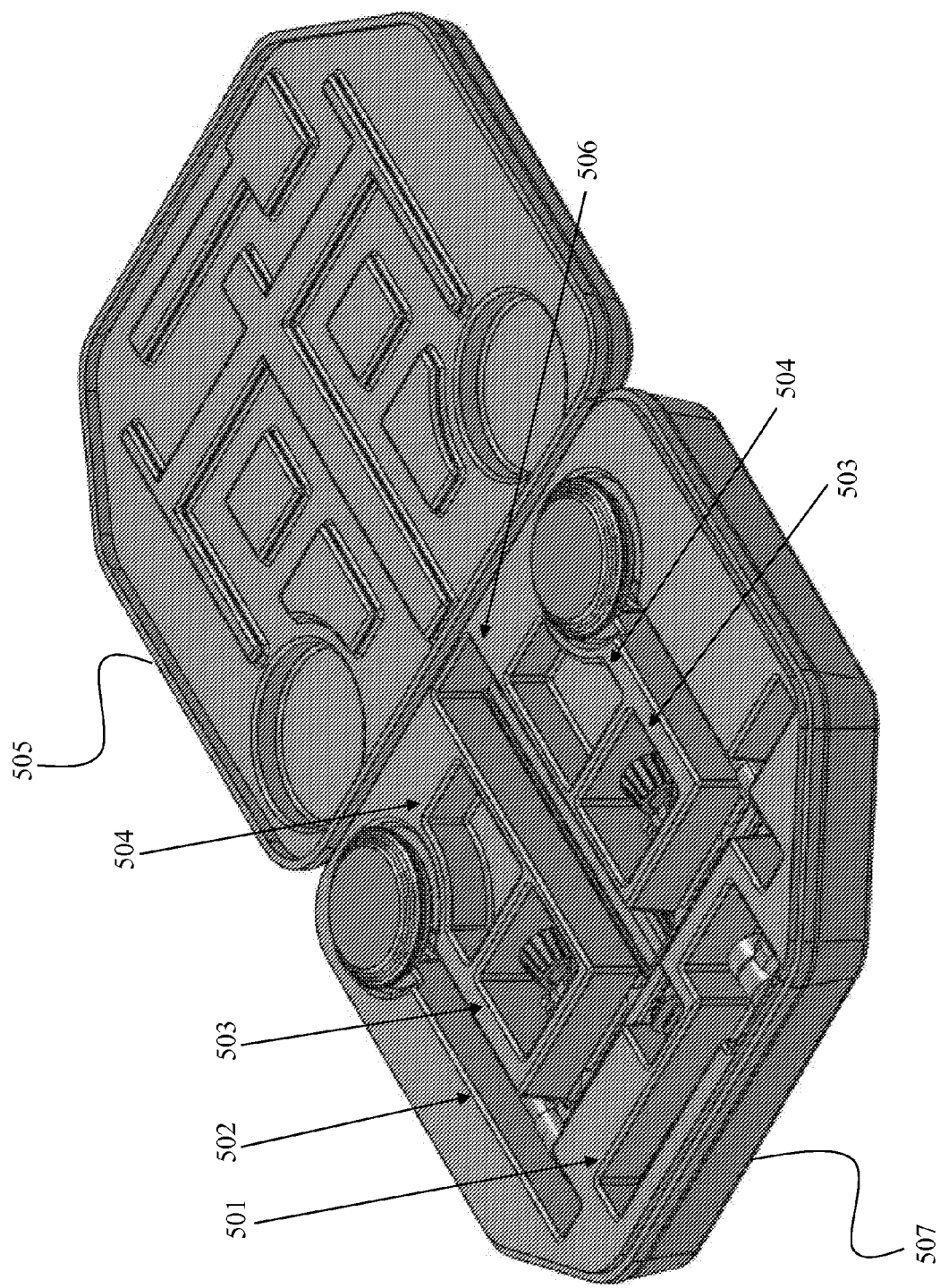
FIG. 5 shows a gas burner case.

FIG. 5 shows a gas burner case. The gas burner case is stored in the cavity of the fire ring. Slots in the case exist to hold parts of the apparatus. The slots are a gas regulator protective slot 501, a gas burner protective slot 502, two gas control valve protective slots 503, two spare parts protective slots 504, and a fire ring support legs protective slot 506. The gas burner case has a gas burner casetop 505 and a gas burner casebottom 507.

Figure 6:
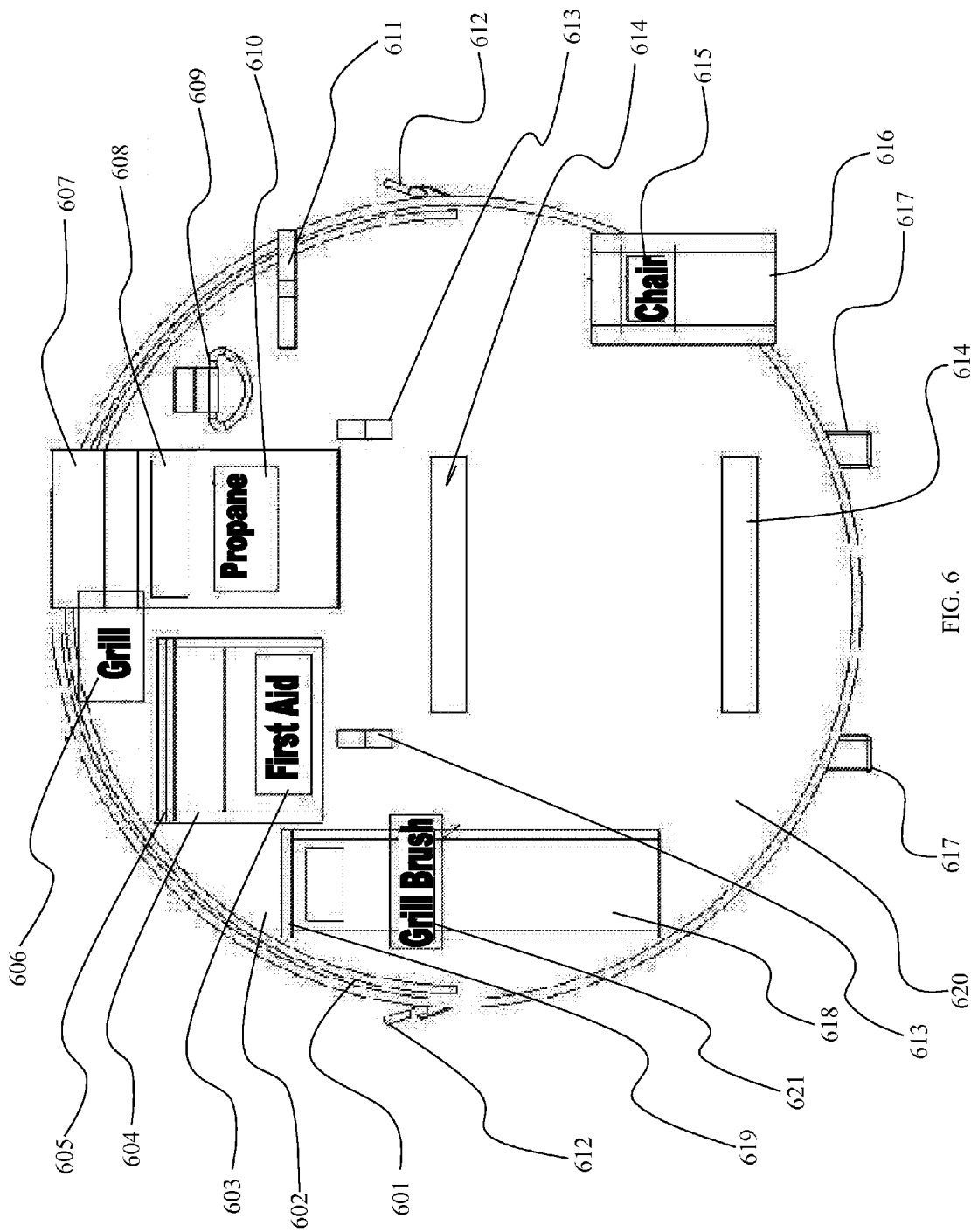
FIG. 6 is a front view of a portable cooking apparatus case.

FIG. 6 is a front view of a portable cooking apparatus case. Shown in the view are a grill pouch zipper 601, a grill pouch flap 602, a first aid pouch label 603, a first aid pouch 604, a first aid pouch cover 605, a grill pouch label 606, a propane gas pouch cover 607, a propane gas pouch 608, a miscellaneous D-ring retaining hook 609, a propane gas pouch label 610, a chefs chair retaining clip 611, shoulder strap D-rings 612, removable pan pouch retaining clips 613, removable pan pouch connection Velcro strips 614, a chefs chair label 615, a chefs chair pouch 616, Shore Lunch Sac support legs 617, a Shore Lunch Sac side-A outside 620, a grill pouch 618, a grill brush pouch label 621, and a grill brush pouch cover 619.

Figure 7:
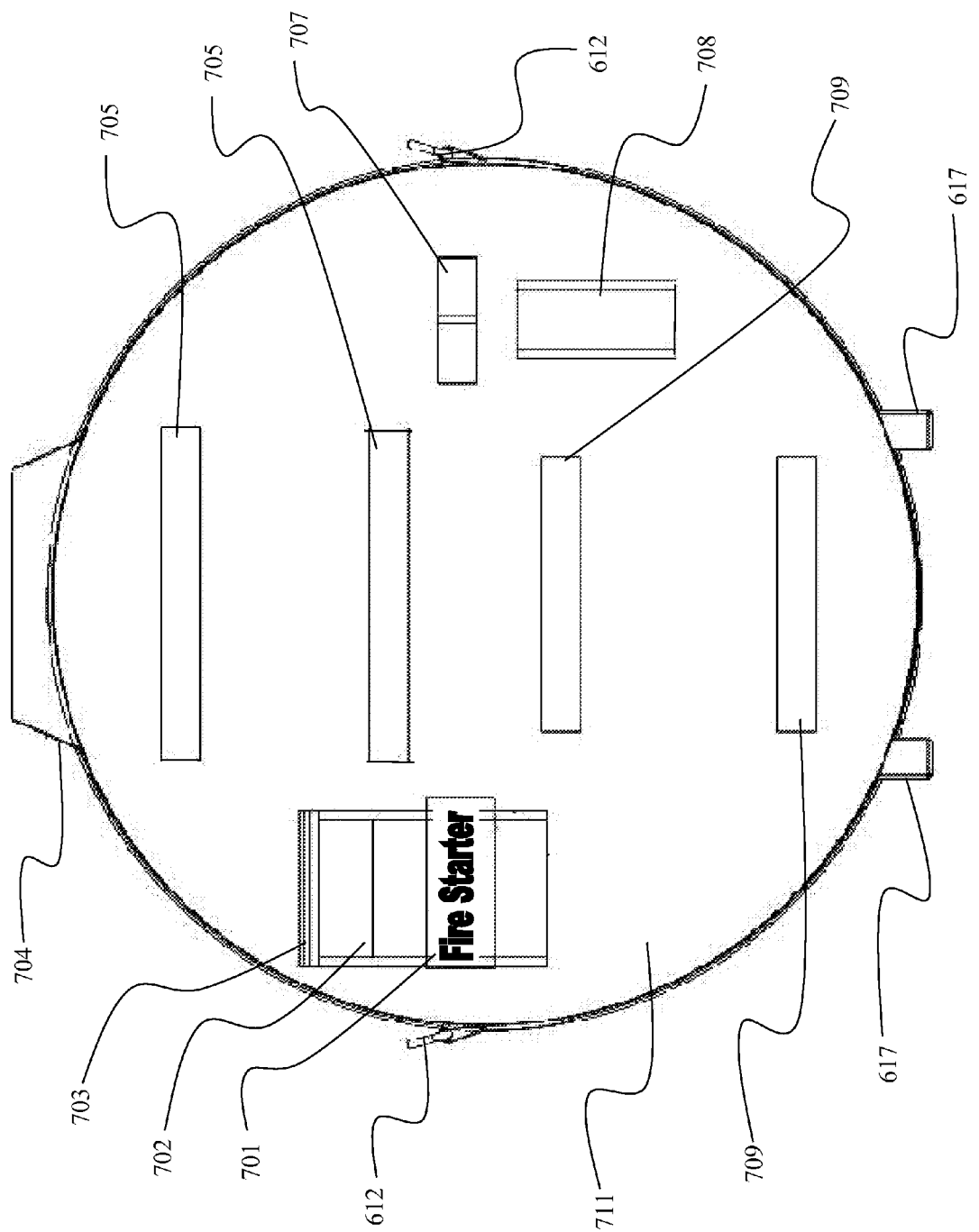
FIG. 7 is an inside A-view of a portable cooking apparatus case.

FIG. 7 is an inside A-view of a portable cooking apparatus case. Shown in the view are shoulder strap D-rings 612, Shore Lunch Sac support legs 617, a fire starter pouch label 701, a fire starter pouch 702, a fire starter pouch cover 703, a carrying handle 704, silverware pouch retaining Velcro strips 705, a fire lighter retaining Velcro strip 707, a fire lighter pouch 708, plates pouch retaining Velcro strips 709, and a Shore Lunch Sac side-A inside 706.

Figure 8:
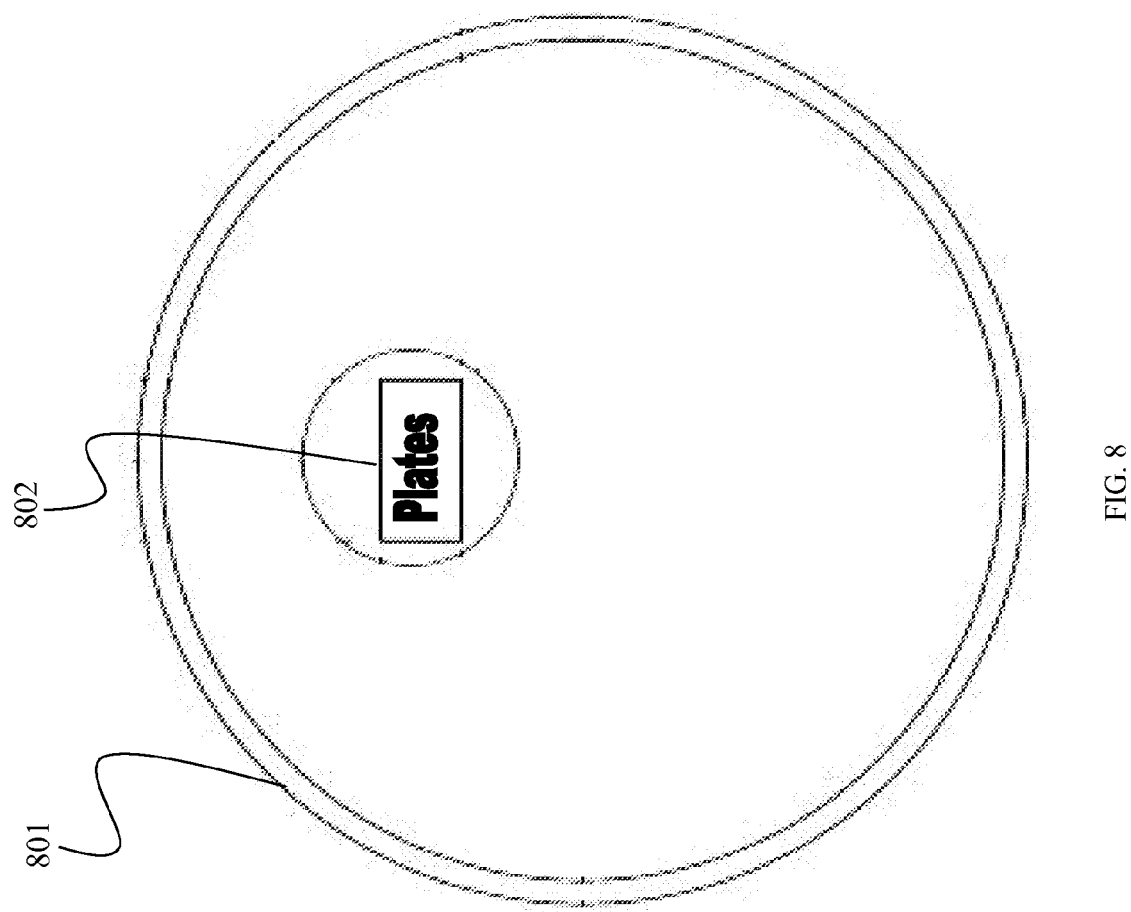
FIG. 8 is a front view of a plate pouch.

FIG. 8 is a front view of a plate pouch. Shown in the view are a removable plate pouch front 801 and a plate pouch label 802.

Figure 9:
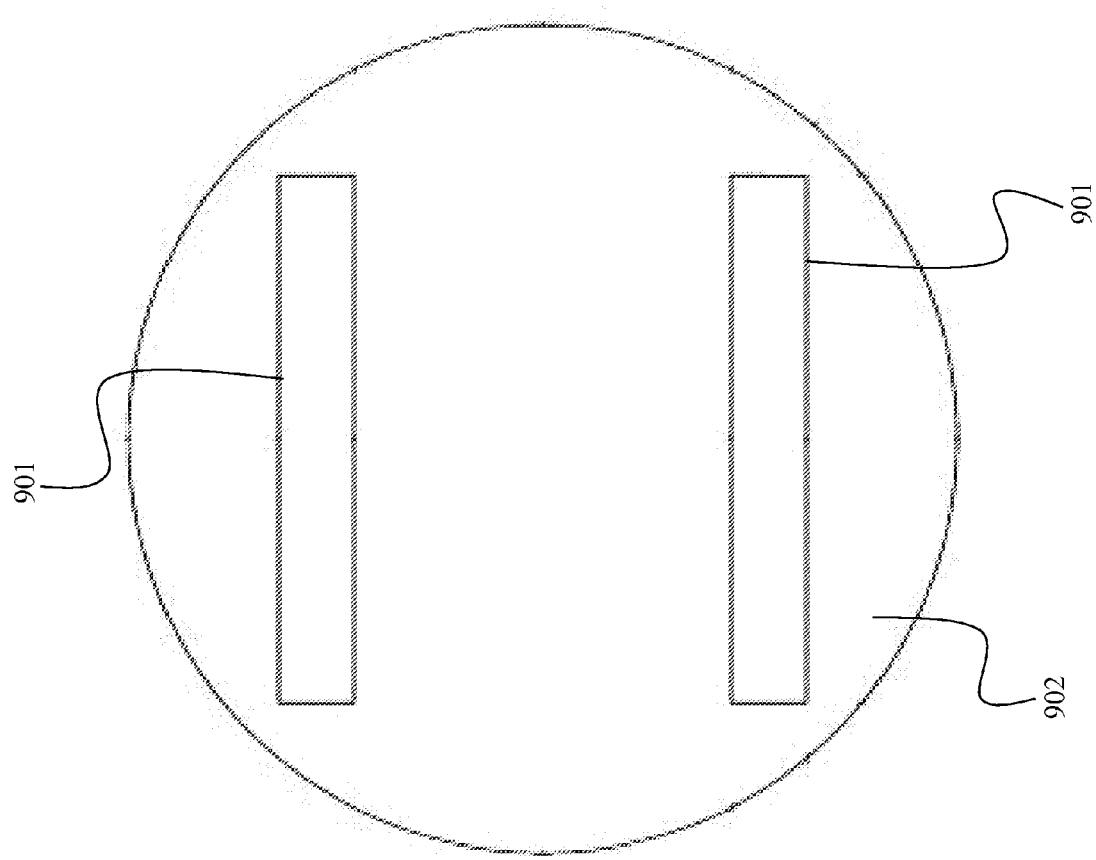
FIG. 9 is a back view of a plate pouch.

FIG. 9 is a back view of a plate pouch. Shown in the view are a removable plate pouch back 902, and plates pouch reciprocal retaining Velcro strips 901.

Figure 10:
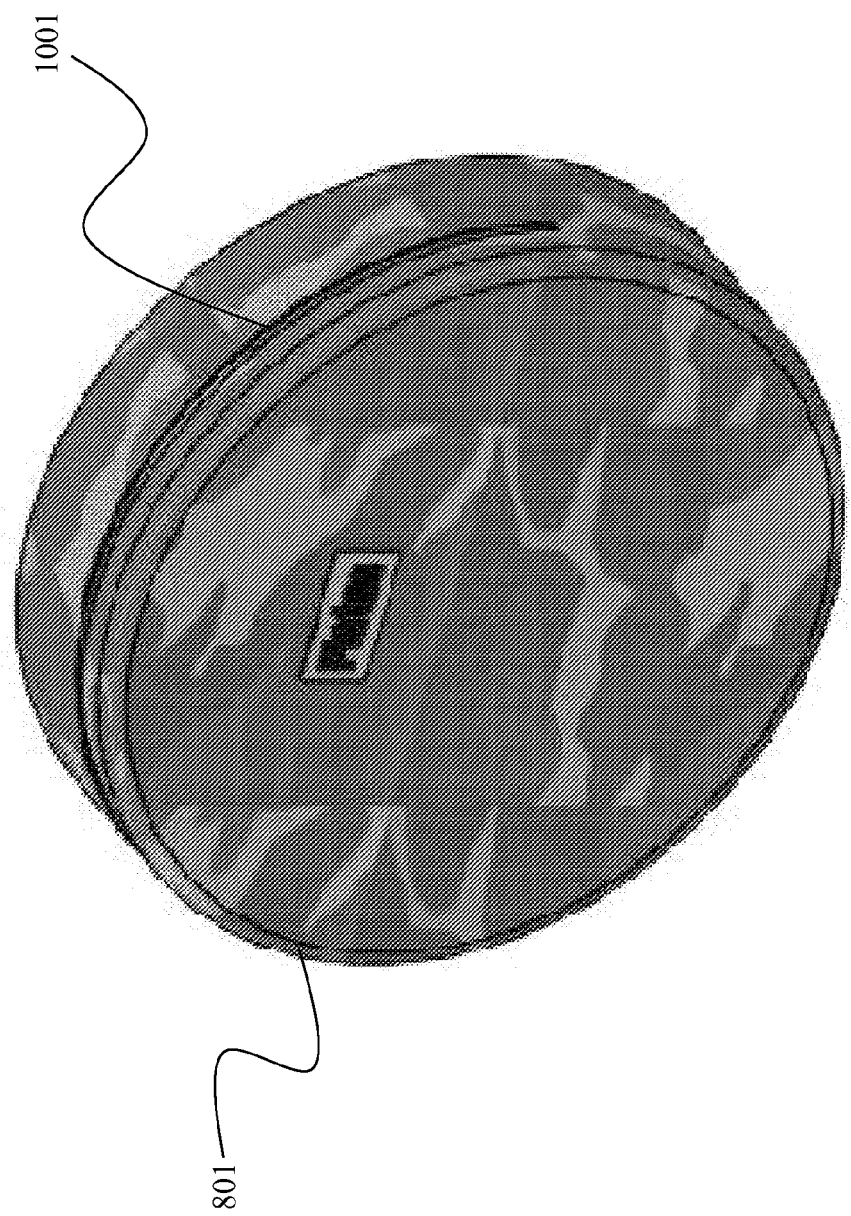
FIG. 10 is an isometric front view of a plate pouch.

FIG. 10 is an isometric front view of a plate pouch. Shown in the view are removable plate pouch front 801, a plate pouch zipper closure 1001.

Figure 11:
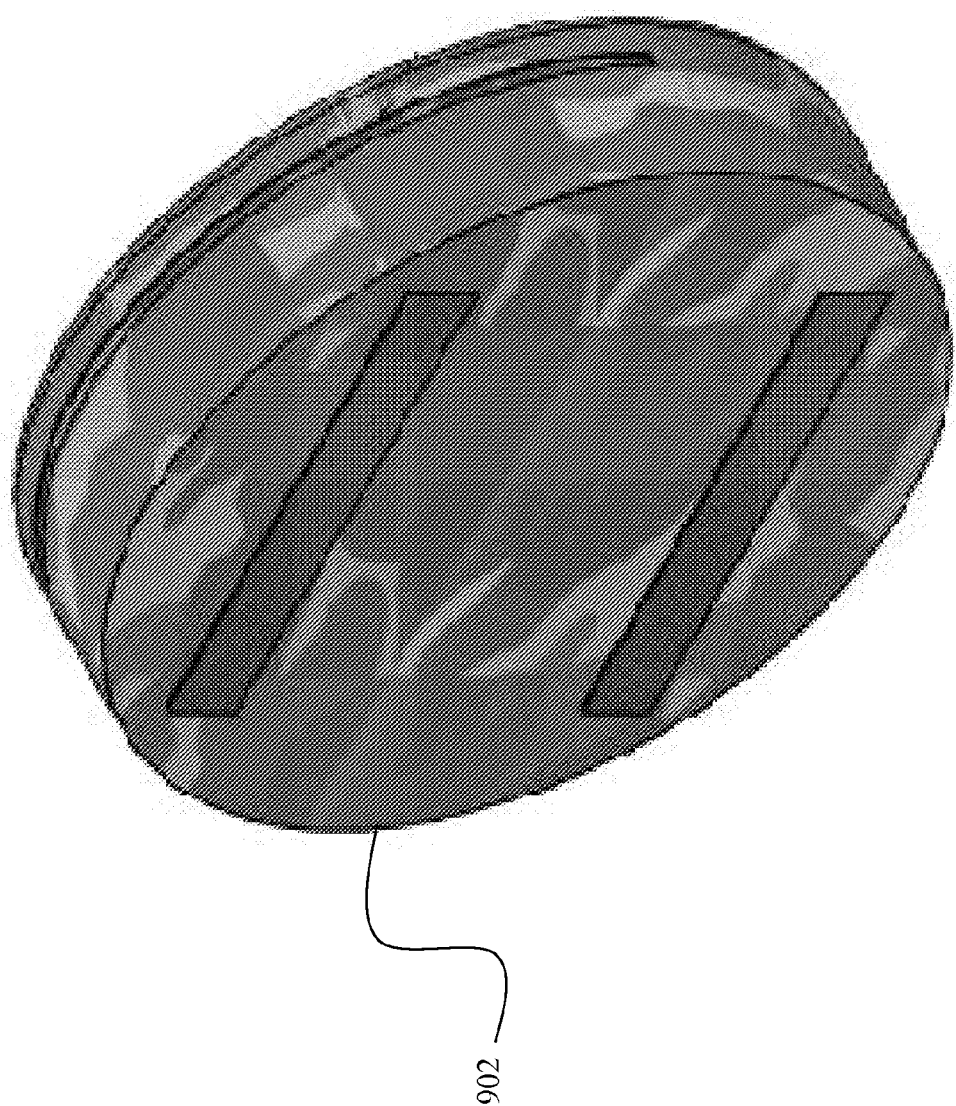
FIG. 11 is an isometric back view of a plate pouch.

FIG. 11 is an isometric back view of a plate pouch. Shown in the view is removable plate pouch back 902.

Figure 12:
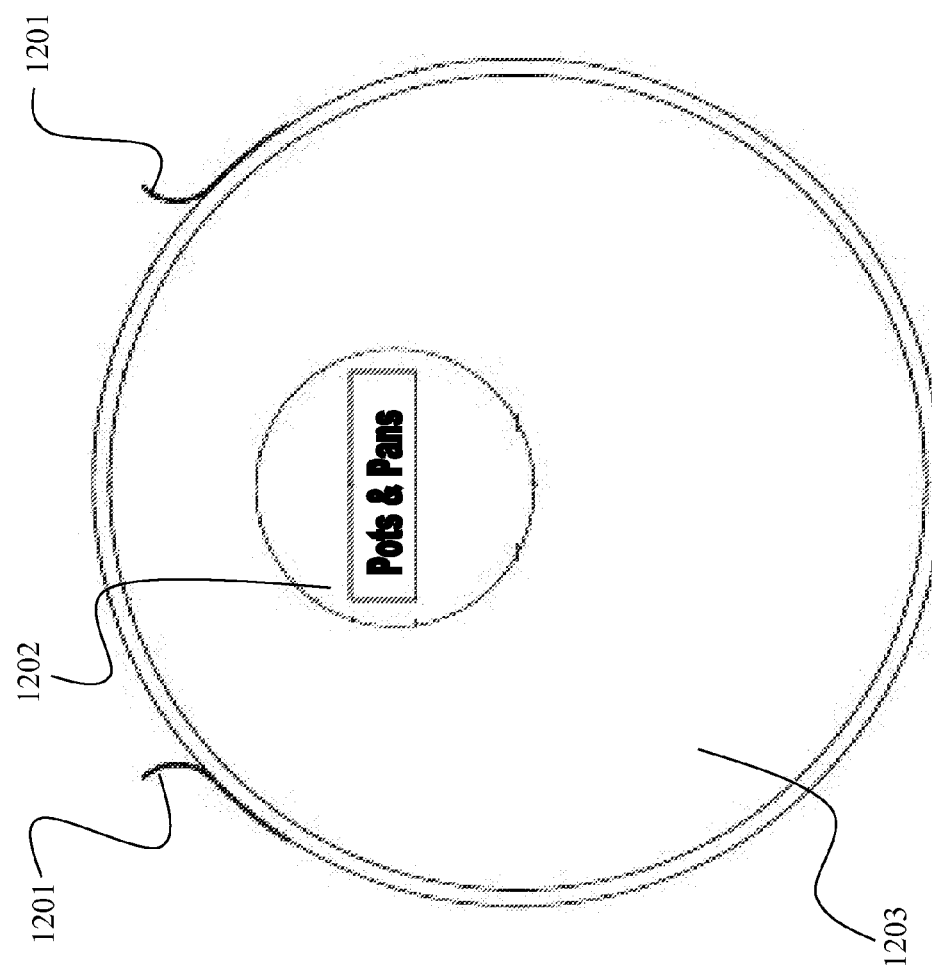
FIG. 12 is a front view of a pots and pans pouch.

FIG. 12 is a front view of a pots and pans pouch. Shown in the view are pots and pans pouch retaining loops 1201, a pots and pans pouch label 1202, and a removable pots and pans pouch front 1203.

Figure 13:
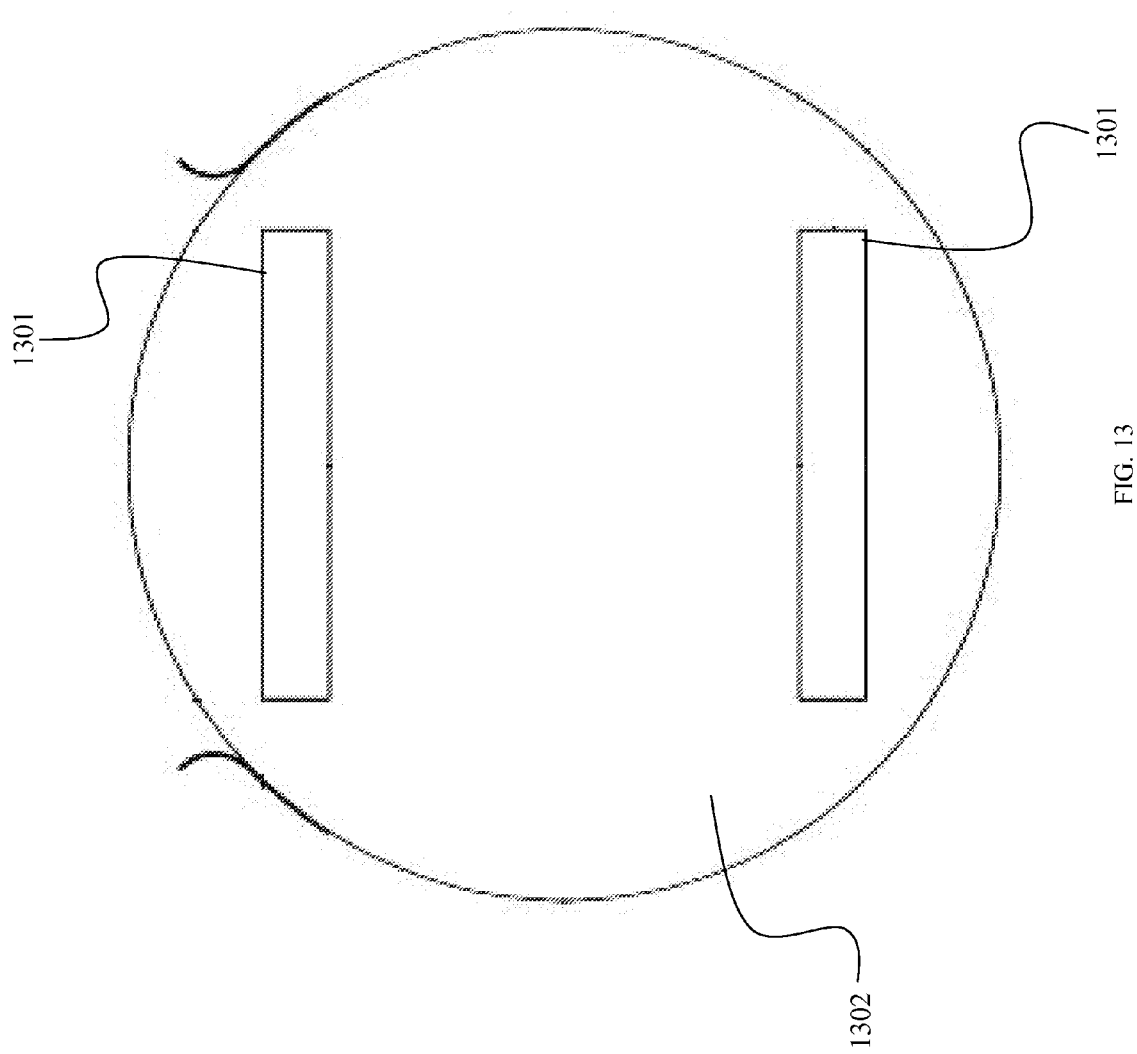
FIG. 13 is a back view of a pots and pans pouch.

FIG. 13 is a back view of a pots and pans pouch. Shown in the view are pots and pans pouch reciprocal retaining Velcro strips 1301 and a removable pots and pans pouch back 1302.

Figure 14:
FIG. 14 is an isometric front view of a pots and pans pouch.

FIG. 14 is an isometric front view of a pots and pans pouch. Shown in the view are a pots and pans pouch zipper closure 1401 and removable pots and pans pouch front 1203.

Figure 15:
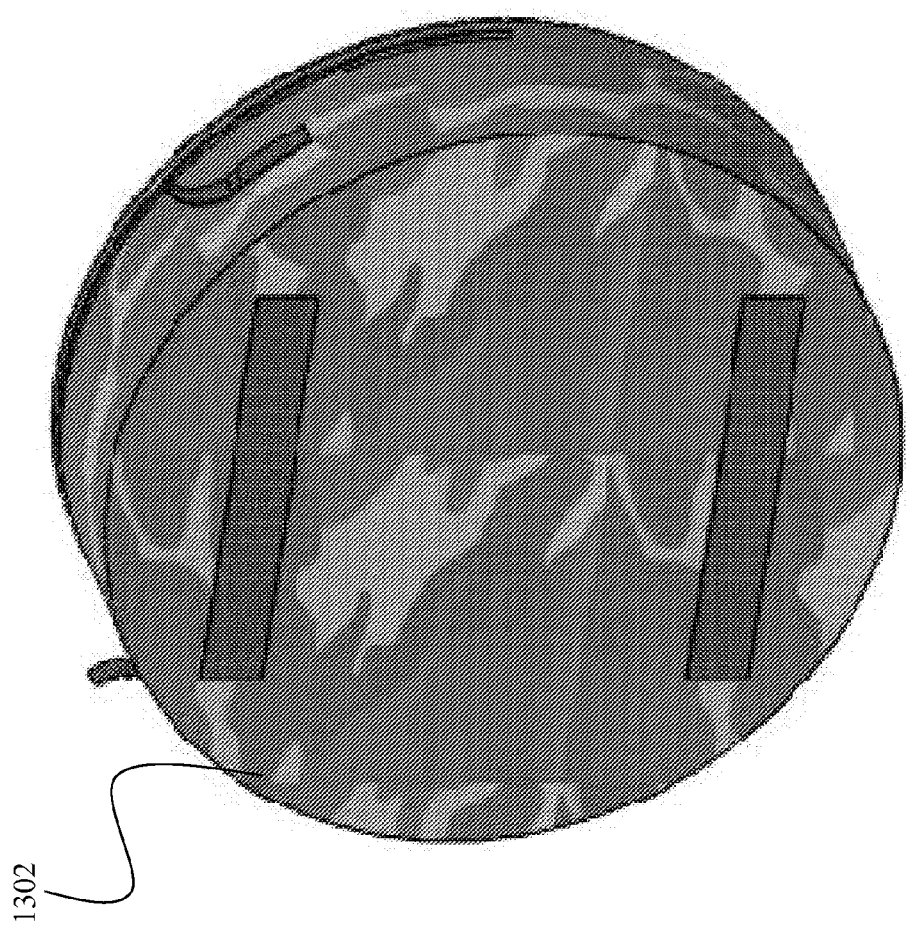
FIG. 15 is an isometric back view of a pots and pans pouch.

FIG. 15 is an isometric back view of a pots and pans pouch. Shown in the view is removable pots and pans pouch back 1302.

Figure 16:
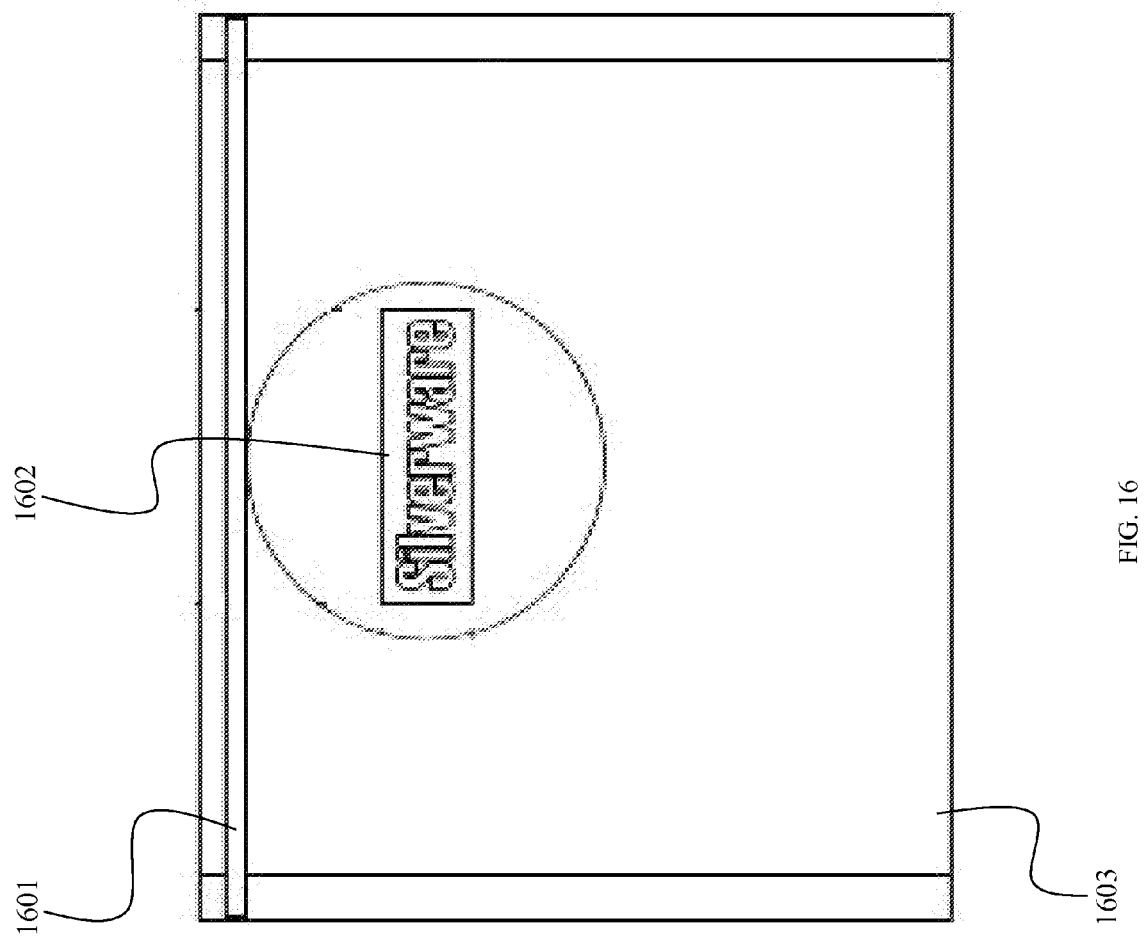
FIG. 16 is a front view of a silverware pouch.

FIG. 16 is a front view of a silverware pouch. Shown in the view are a silverware pouch zipper closure 1601, a silverware pouch label 1602, and a removable silverware pouch front 1603.

Figure 17:
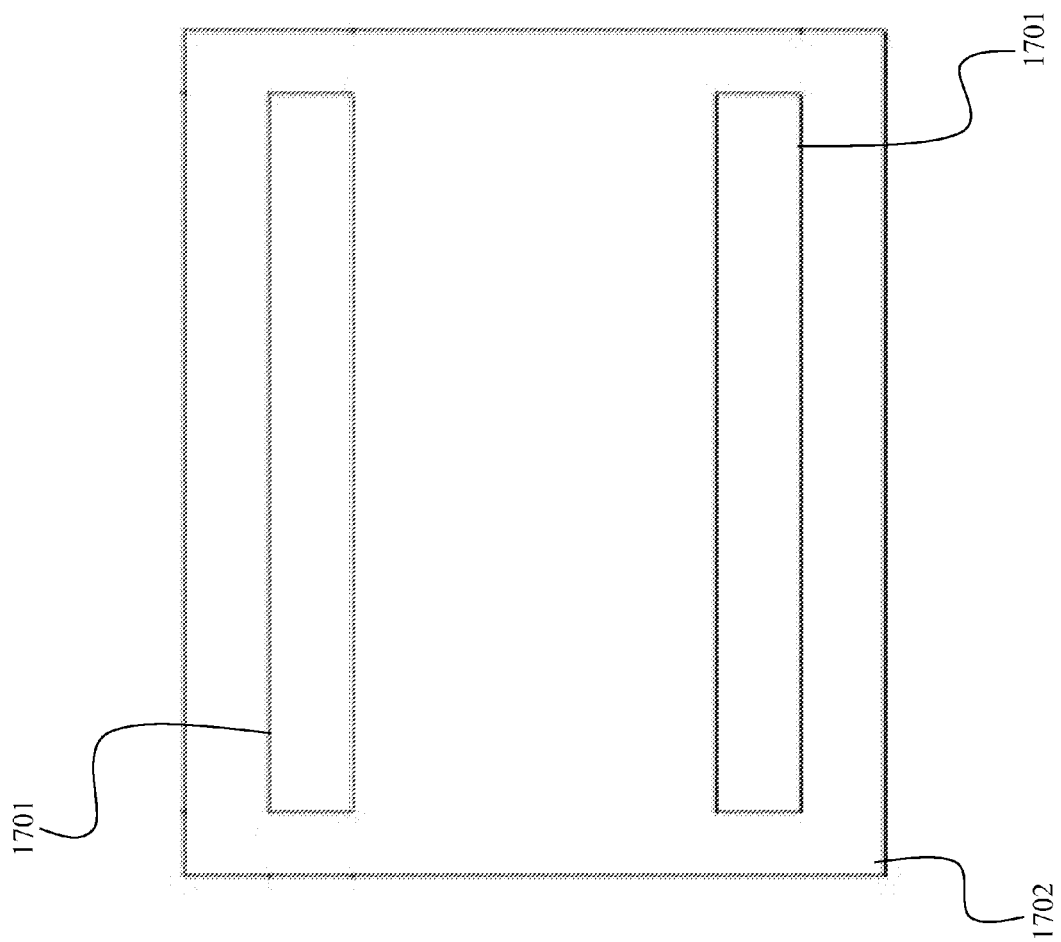
FIG. 17 is a back view of a silverware pouch.

FIG. 17 is a back view of a silverware pouch. Shown in the view are silverware pouch reciprocal Velcro strips 1701 and a removable silverware pouch back 1702.

Figure 18:
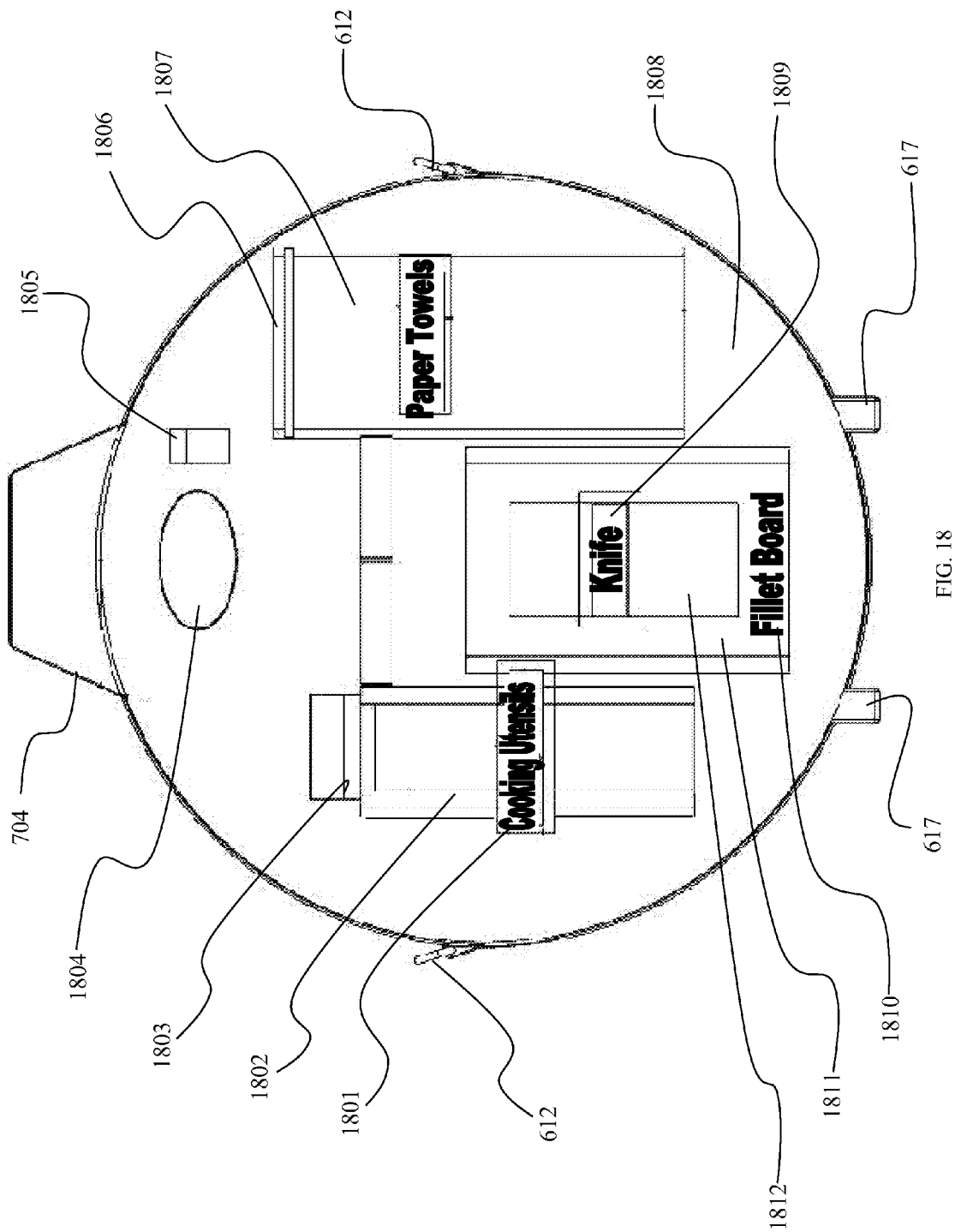
FIG. 18 is a back of a portable cooking apparatus case.

FIG. 18 is a back of a portable cooking apparatus case. Shown in the view are shoulder strap D-rings 612, carrying handle 704, Shore Lunch Sac support legs 617, a cooking utensils pouch label 1801, a cooking utensils pouch 1802, a cooking utensils pouch cover 1803, a Shore Lunch Sac logo plate 1804, a miscellaneous Velcro retainer 1805, a paper towels pouch cover 1806, a paper towels pouch 1807, a Shore Lunch Sac side-B outside 1808, a fillet knife pouch label 1809, a fillet board pouch label 1810, a fillet board pouch 1811, and a fillet knife pouch 1812. The cooking utensils pouch 1802 has two compartments (not shown), one for cooking utensils and one for miscellaneous items.

Figure 19:
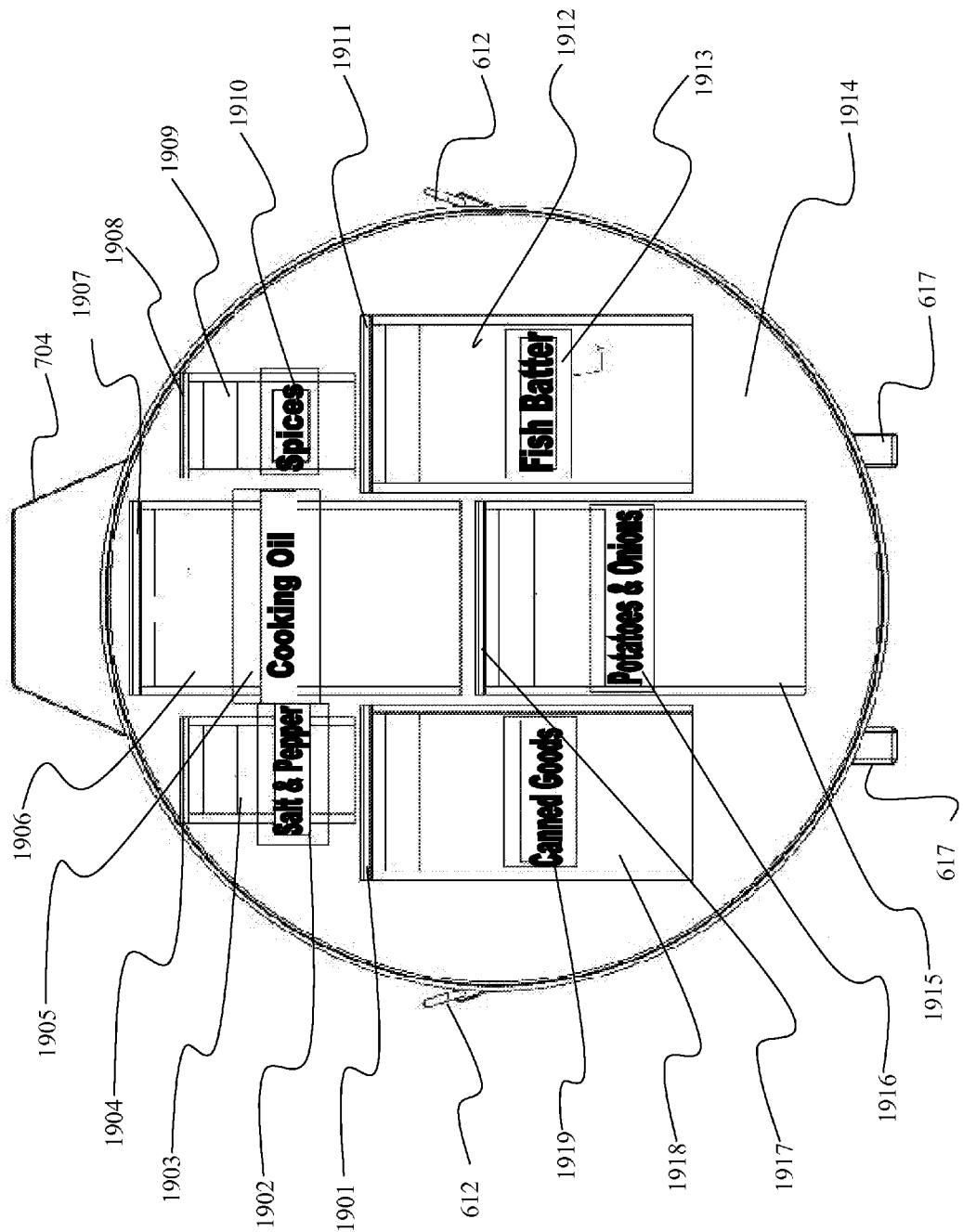
FIG. 19 is an inside right-view of an apparatus case.

FIG. 19 is an inside B-view of an apparatus portable cooking case. Shown in the view are shoulder strap D-rings 612, carrying handle 704, Shore Lunch Sac support legs 617, a canned goods pouch cover 1901, a salt & pepper pouch label 1902, a salt & pepper pouch 1903, a salt & pepper pouch cover 1904, a cooking oil pouch label 1905, a cooking oil pouch 1906, a cooking oil pouch cover 1907, a spices pouch cover 1908, a spices pouch 1909, a spices pouch label 1910, a fish batter pouch cover 1911, a fish batter pouch 1912, a fish batter pouch label 1913, a Shore Lunch Sac side-B inside 1914, a potatoes and onions pouch 1915, a potatoes and onions pouch label 1916, a potatoes and onions pouch cover 1917, a canned goods pouch 1918, and a canned goods pouch label 1919.

Figure 20:
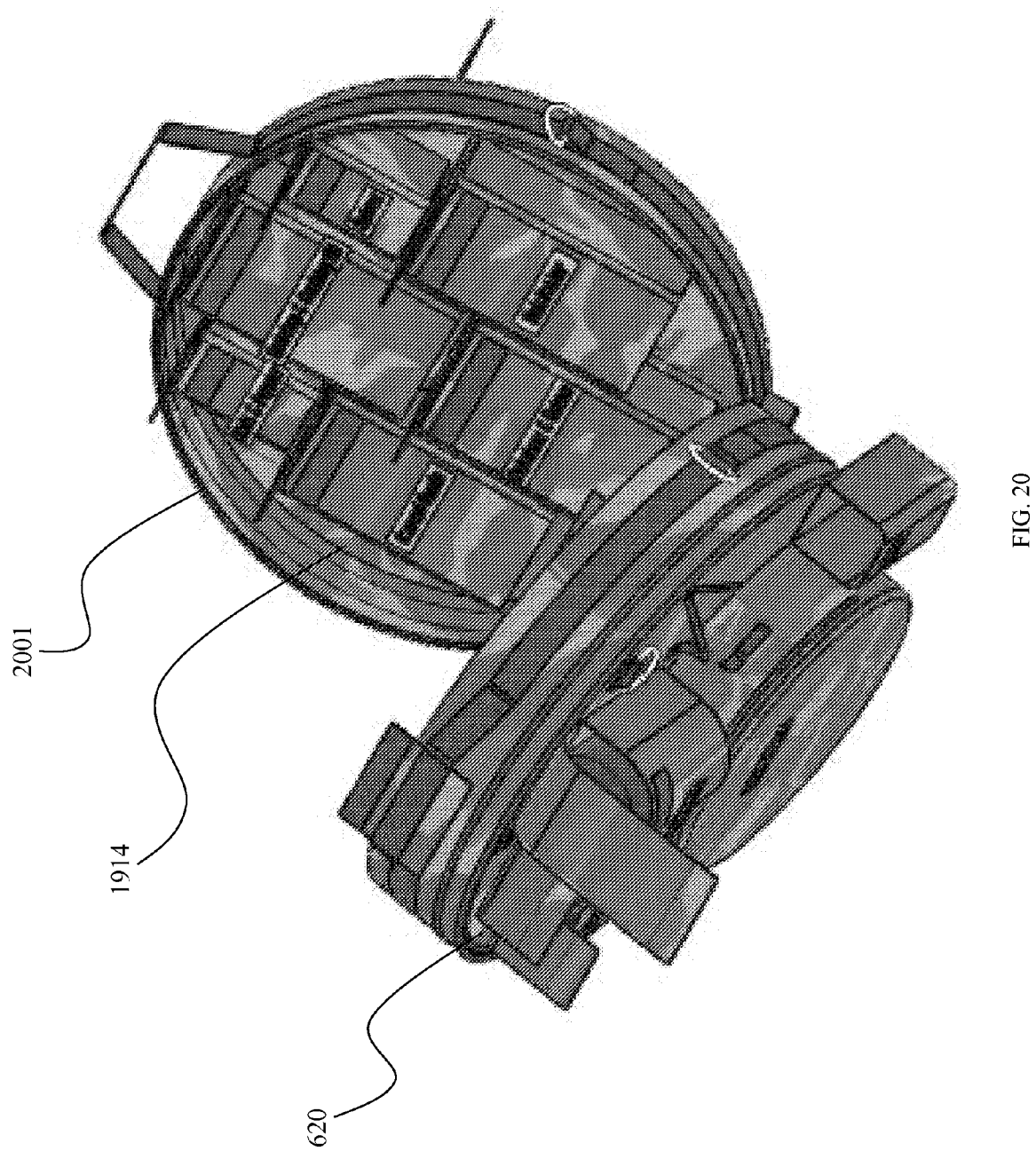
FIG. 20 is an isometric view of the apparatus case showing the inside right-view.

FIG. 20 is an isometric view of the apparatus case showing the inside right-view. Shown in the view are Shore Lunch Sac side-B inside 1914, a Shore Lunch Sac zipper closure 2001, and Shore Lunch Sac side-A outside 620.

Figure 21:
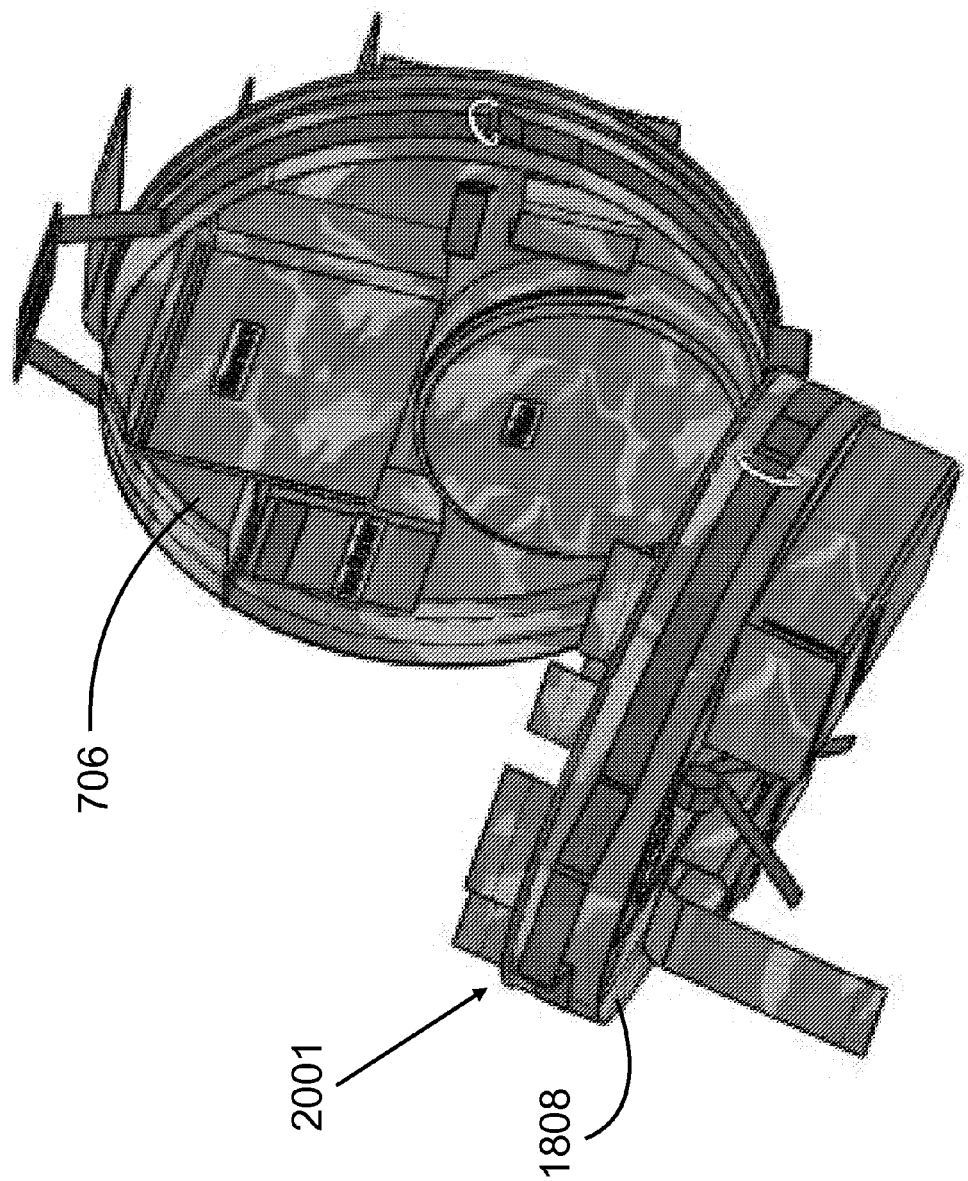
FIG. 21 is an isometric view of the apparatus case showing the inside left-view.

FIG. 21 is an isometric view of the apparatus case showing the inside left-view. Shown in the view are Shore Lunch Sac side-A inside 706, Shore Lunch Sac zipper closure 2001, and Shore Lunch Sac side-B outside 1808.

FIG. 22 is a bottom view of the apparatus case while the case is open 90 degrees. Shown in the view are Shore Lunch Sac side-A outside 620 and Shore Lunch Sac side-B outside 1808.

The Shore Lunch Sac contains all of the items labeled on the various pouches within it. The removable charcoal pan and the removable grill are stored in a zipped pouch on the outside of the Shore Lunch Sac. The two halves of the Shore Lunch Sac are zipped together and the entire apparatus with case may be transported via attached handles or shoulder straps.

The Shore Lunch Sac may be used in various ways. One method is to place the fire ring directly on the ground without legs or the charcoal pan. Then, wood is placed in the center and ignited. The grill is placed on top to begin cooking. If more wood is required, it may be inserted through the wood hole.

A second method of using the Shore Lunch Sac is to attach the legs to the fire ring. Next, insert the charcoal pan. The charcoal pan may be placed on the lower tabs or, by utilizing the handles, may be set at an elevated height by aligning the handles with the slots in the fire ring. Once cooking has begun, the height is not adjustable. Charcoal is added prior to placement of the grill. It is possible, although not practical, to add charcoal through the wood feeder hole.

A third method of using the Shore Lunch Sac is to attach the legs to the fire ring. Inserting the charcoal pan is preferable but not necessary. The gas burner unit is inserted from the center of the fire ring by aligning the gas burner with the holes provided and securing the gas burner unit with fasteners.

The Shore Lunch Sac windscreen is attached to and stored in the fire ring via the channel. The windscreen may be used in any configuration of the Shore Lunch Sac.

All Shore Lunch Sac pouches are secured with Velcro unless otherwise specified with zippers.

The Shore Lunch Sac container may have different embodiments (e.g. rectangular shape) and sizes to accommodate stoves from other manufacturers.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

We claim:

1. A portable cooking apparatus, the apparatus comprising:
    a fire ring, wherein the fire ring has a side entry port configured to allow wood or charcoal to be introduced into the apparatus;
    a retractable wind screen which is operationally attached to the top of the fire ring,
    wherein the windscreen is the same maximum height as the fire ring and traverses less than half of a circumference of the fire ring;
    a charcoal pan which is operationally attached to the bottom of the fire ring; a grill which is operationally attached to the fire ring above the charcoal pan; means to use gas; and
    a plurality of detachable support legs operationally attached to the side of the fire ring,
    wherein the apparatus may be used when the fire ring is placed directly on a ground without said legs or the charcoal pan.

2. The apparatus of claim 1, wherein the wind screen is extendable and retractable.

3. The apparatus of claim 1, wherein the fire ring consists of metal.

4. The apparatus of claim 1, wherein the grill can be operationally attached to the fire ring at different locations, enabling different heat settings for cooking.

5. The apparatus of claim 1, further comprising a case for carrying the portable cooking apparatus.

6. The apparatus of claim 5, wherein the wind screen is extendable and retractable.

7. The apparatus of claim 5, wherein the fire ring consists of metal.

8. The apparatus of claim 5, wherein the grill can be operationally attached to the fire ring at different locations, enabling different heat settings for cooking.

9. The apparatus of claim 1, wherein the means to use gas comprises removable gas burners inserted into the sides of the fire ring.

\* \* \* \* \*